US006763752B2

(12) United States Patent
Marshall et al.

(10) Patent No.: US 6,763,752 B2
(45) Date of Patent: Jul. 20, 2004

(54) APPARATUS FOR TRIMMING A FLANGE ON A CYLINDRICAL OPENING OF A PLASTIC CONTAINER

(75) Inventors: Harold James Marshall, Forest, VA (US); Mohamed Hachem Saadi El Hachem, Lynchburg, VA (US); William Storrs Reynolds, Lynchburg, VA (US)

(73) Assignee: Delaware Capital Formation, Inc., Wilmington, DE (US)

( * ) Notice: Subject to any disclaimer, the term of this patent is extended or adjusted under 35 U.S.C. 154(b) by 194 days.

(21) Appl. No.: 09/985,315

(22) Filed: Nov. 2, 2001

(65) Prior Publication Data

US 2002/0056346 A1 May 16, 2002

Related U.S. Application Data

(60) Provisional application No. 60/244,924, filed on Nov. 2, 2000.

(51) Int. Cl.[7] .............................................. B23D 19/04
(52) U.S. Cl. ............................. 83/499; 83/504; 83/676; 83/914; 83/946; 82/53; 82/57
(58) Field of Search ........................ 83/946, 914, 499, 83/504, 676; 82/53, 54, 57, 58, 61, 62; 30/412, 416, 418, 1.5

(56) References Cited

U.S. PATENT DOCUMENTS

| 545,131 | A | * | 8/1895 | Ohler ............................ 82/57 |
| 2,269,422 | A | | 1/1942 | Ayars |
| 2,388,804 | A | | 11/1945 | Schurch |
| 2,886,157 | A | | 5/1959 | Hall |
| 3,231,061 | A | | 1/1966 | Borkmann |
| 3,470,582 | A | * | 10/1969 | Martin ......................... 425/525 |
| 3,487,501 | A | * | 1/1970 | Siard et al. ................. 425/527 |
| 3,659,486 | A | * | 5/1972 | Criss et al. ..................... 82/82 |
| 3,769,394 | A | * | 10/1973 | Latreille ...................... 264/533 |
| 4,014,228 | A | * | 3/1977 | Dean ............................. 82/47 |
| 4,030,432 | A | * | 6/1977 | Miller et al. .................. 413/69 |
| 4,467,908 | A | | 8/1984 | Schneider |
| 4,557,167 | A | | 12/1985 | Cvacho .......................... 82/47 |
| 5,431,076 | A | | 7/1995 | McPhail ....................... 82/1.3 |
| 5,749,275 | A | | 5/1998 | Dundas et al. ................. 83/24 |
| 5,791,217 | A | | 8/1998 | Dundas et al. ................. 83/13 |
| 6,158,317 | A | | 12/2000 | Maddox et al. ............... 83/136 |

\* cited by examiner

Primary Examiner—Allan N. Shoap
Assistant Examiner—John Windmuller
(74) Attorney, Agent, or Firm—Foley & Lardner LLP (57) ABSTRACT

The present invention includes a trim station for trimming the flange of a container, an apparatus for trimming the flange of a container and a method of trimming the flange of a container. The trim station includes a rotating primary knife and a secondary knife mounted on a movable member, wherein the secondary knife is moved into a cutting position by advancing the movable member in a direction parallel to the axial direction of the container. The present invention also includes a spindle assembly and a container by process of trimming the flange of the container.

18 Claims, 9 Drawing Sheets

APPARATUS FOR TRIMMING A FLANGE ON A CYLINDRICAL OPENING OF A PLASTIC CONTAINER

CROSS-REFERENCE TO RELATED PATENT APPLICATIONS

This application is a Non-Provisional of U.S. Provisional Application 60/244,924, filed Nov. 2, 2000.

FIELD OF THE INVENTION

The present invention is directed generally to machinery for plastic container production and specifically to an apparatus for trimming a flange on a cylindrical opening of a blow molded plastic container.

BACKGROUND OF THE INVENTION

Due to economic considerations, wide mouth blow molded containers are currently manufactured by employing standard small mouth preforms. With these preforms, a blown container having a narrow dome portion expanding to a wider dome portion connected to the mouth of the wide mouth container is initially formed. Then the dome portion is removed, leaving the wide mouth container. This process is advantageous because standard small mouth preforms are manufactured in the hundreds of millions and are inexpensive. In contrast, use of special wide mouth preforms for each new container design would be significantly more expensive. Thus, there is a considerable economic advantage in use of standard small mouth preforms in the manufacture of wide mouth blow molded containers.

Figure 1:
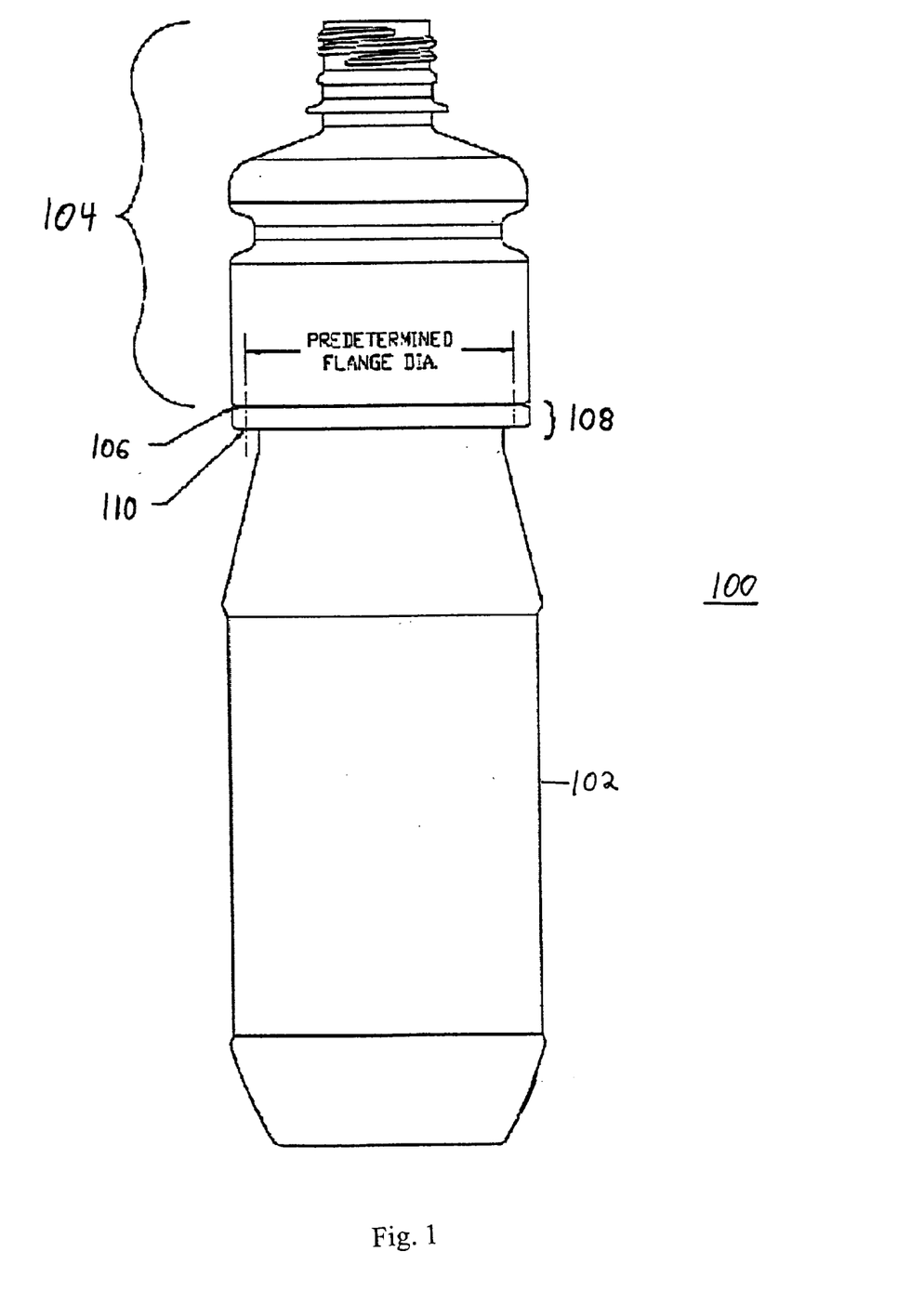
FIG. 1 is a cross-sectional view of an as-blown blow molded container.
Figure 2:
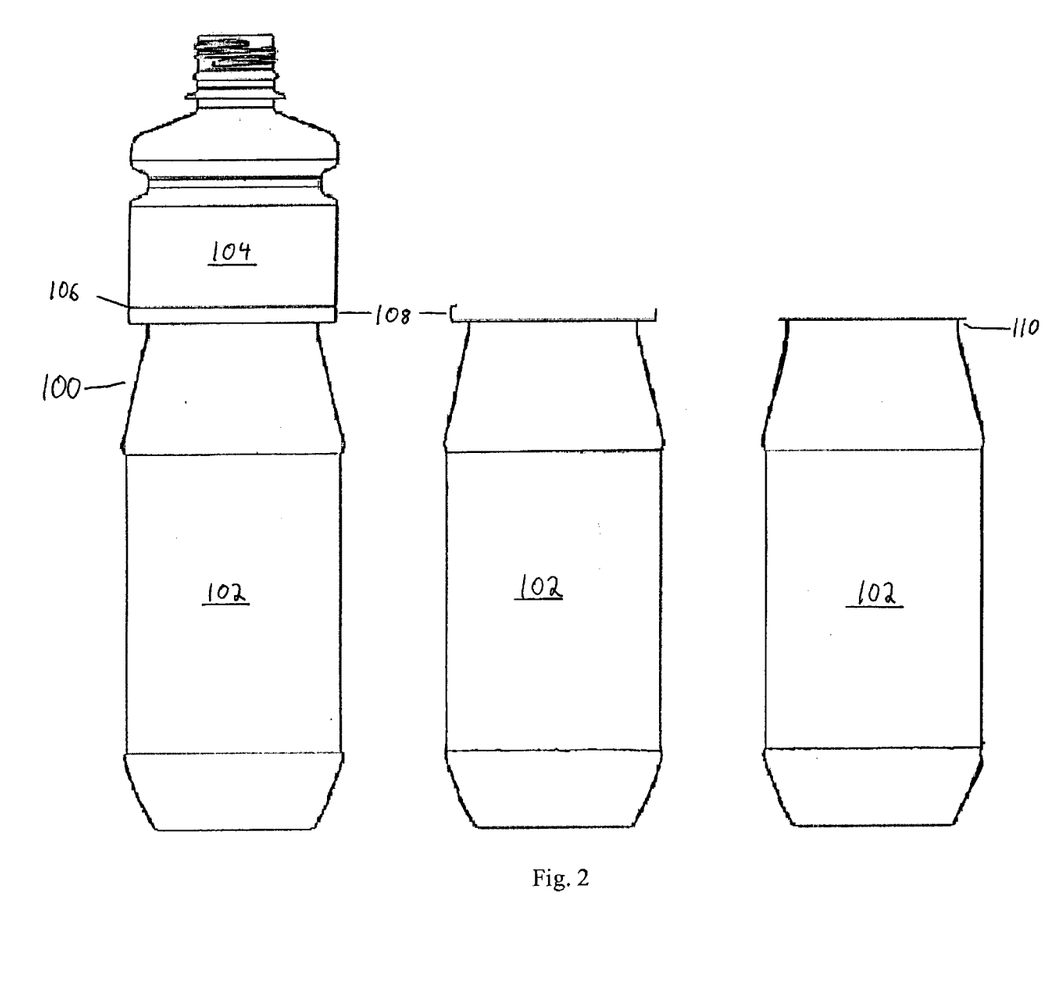
FIG. 2 is a schematic illustration of the manufacture of a wide mouth blow molded container where (a) is as-blown, (b) is pre-trimmed and (c) is flange trimmed.

The current manufacturing process for wide mouth blow molded containers can be explained with the aid of FIGS. 1 and 2. FIG. 1 illustrates a typical wide mouth blow molded container 100 in the as-blown condition, while FIG. 2 illustrates several steps in the manufacture of a wide mouth container. The bottle 100 comprises two portions, a body portion 102 and a dome portion 104. Separating the body portion 102 and the dome portion 104 is a radially inwardly extending circumferential trim line groove 106. Below the trim line groove 106 is a trim scrap ring 108, which comprises the desired outer flange 110.

As in the manufacture of small mouth blow molded containers, the first step is a preliminary trimming step in which the dome portion 104 is removed (FIG. 2b). However, to complete the wide mouth bottle, an additional trimming step is required to remove the trim scrap ring 108 and form the outer flange 110 (FIG. 2c). Because, an outer flange is required, the prior art reverse punch method cannot be used. Further, use of the ream method is undesirable because of the likelihood of scattered chips entering the container.

Methods of trimming external flanges are known in the can making art. In one conventional method, the can is first mounted on a rotating vacuum chuck. The chuck is then advanced until the can abuts a rotating main disc cutter. To cut the flange, a rotating auxiliary disc cutter located below the flange is advanced until it pierces the flange. In this system, the vacuum chuck, the main disc cutter and the auxiliary disc cutter are all independently driven and must be carefully coordinated to ensure a quality cut surface. To further improve the quality of the cut and aid in scrap ring removal, the auxiliary disc cutter is advanced at an angle to the axial direction of the can. This apparatus and method is suitable for trimming the flanges of a metal can. However, trimming a plastic blow molded bottle with this apparatus and method results in a flange with numerous burrs and slivers.

The prior art methods of trimming an inner flange on a blow molded container are either inappropriate for trimming an outer flange, expensive, have undesirable side effects or result in poor quality flanges. Thus, it would be desirable to have an apparatus and method of trimming an outside flange that was efficient, inexpensive, had no deleterious side effects and produced a reliable high quality flange.

SUMMARY OF THE INVENTION

The present invention includes a trim station for trimming a flange of a container comprising a rotating primary knife and a secondary knife mounted on a movable member, wherein the secondary knife is moved into a cutting position by advancing the movable member in a direction parallel to an axial direction of the container.

In another aspect of the invention, the present invention also includes a trim station as noted above, further comprising a centering cone adapted to center the container on the rotating primary knife.

In another aspect of the invention, the present invention also includes a trim station as noted above, further comprising a spindle assembly having a cam and a cam follower, wherein the spindle assembly is adapted to raise the container to the centering cone.

In another aspect of the invention, the present invention also includes a trim station as noted above, wherein the secondary knife is frictionally driven by the primary knife.

In another aspect of the invention, the present invention also includes a trim station as noted above, further comprising a trim ring ejector plate to remove a trimmed flange from the trim station.

In another aspect of the invention, the present invention also includes a trim station as noted above, further comprising a moving mechanism to advance the movable member.

In another aspect of the invention, the present invention also includes a trim station as noted above, wherein the moving mechanism is selected from a group consisting of a pneumatic mechanism, a mechanical mechanism and an electrical mechanism.

In another aspect of the invention, the present invention also includes a trim station as noted above, wherein the moving mechanism further comprises a spring adapted to hold the secondary knife in a cutting position.

In another aspect of the invention, the present invention also includes a trim station as noted above, further comprising a cut adjustment mechanism to adjust the depth of the cut.

In another aspect of the invention, the present invention also includes a trim station as noted above, wherein the rotation axes of the primary knife and the secondary knife are offset.

In another aspect of the invention, the present invention also includes a trim station as noted above, wherein the offset is from 1 mm to 12 mm.

In another aspect of the invention, the present invention also includes a trim station as noted above, wherein the offset is from 5 mm to 9 mm.

In another aspect of the invention, the present invention also includes a trim station as noted above, wherein the offset is 7 mm.

The present invention also includes an apparatus for trimming a flange of a container, comprising a plurality of trim stations, wherein each trim station includes a rotating primary knife and a secondary knife mounted on a movable member and the secondary knife is moved into a cutting position by moving the movable member in a direction parallel to the axial direction of the container.

In another aspect of the invention, the present invention also includes the apparatus as noted above, wherein the plurality of trim stations are mounted on a rotating trim turret.

In another aspect of the invention, the present invention also includes the apparatus as noted above, further comprising an infeed starwheel for supplying containers to a trim station.

In another aspect of the invention, the present invention also includes the apparatus as noted above, further comprising a discharge starwheel to transfer a container from a trim station out of the apparatus.

In another aspect of the invention, the present invention also includes the apparatus as noted above, further comprising a pretrim station.

In another aspect of the invention, the present invention also includes the apparatus as noted above, wherein the pretrim station is configured to remove the dome portion of a plastic bottle.

The present invention also includes a method of trimming the flange of a container comprising the steps of loading a container with a flange on a container holder of a spindle assembly, advancing the container toward a primary knife by advancing a spindle in the spindle assembly, advancing a secondary knife in a direction substantially parallel to an axial direction of the container until it penetrates the flange of the container; and cutting the flange until the flange is completely severed from the container.

In another aspect of the invention, the present invention also includes the method above, further comprising a step of adjusting the depth of penetration of the secondary knife into the flange of the container.

In another aspect of the invention, the present invention also includes the method above, further comprising the step of centering the container on a centering cone affixed to the primary knife.

In another aspect of the invention, the present invention also includes the method above, wherein the step of cutting comprises rotating the container.

In another aspect of the invention, the present invention also includes the method above, wherein the primary knife is driven and the container rotates by frictional contact with the primary knife.

In another aspect of the invention, the present invention also includes the method above, wherein the container holder is rotatably mounted with bearings on the spindle.

In another aspect of the invention, the present invention also includes the method above, wherein the container holder rotates by frictional contact with the container.

In another aspect of the invention, the present invention also includes the method above, wherein the frictional contact is maintained by springs in the spindle assembly.

In another aspect of the invention, the present invention also includes the method above, wherein the secondary knife is frictionally driven by contact with the flange of the container.

In another aspect of the invention, the present invention also includes the method above, wherein the primary knife, the container and the secondary knife rotate at essentially the same speed.

In another aspect of the invention, the present invention also includes the method above, wherein the step of advancing the container comprises rotating the spindle assembly over a stationary cam.

In another aspect of the invention, the present invention also includes the method above, wherein the step of advancing the secondary knife is performed with a moving mechanism.

In another aspect of the invention, the present invention also includes the method above, wherein the moving mechanism is selected from the group consisting of a pneumatic mechanism, a mechanical mechanism or an electric mechanism.

In another aspect of the invention, the present invention also includes the method above, wherein the secondary knife is held in a cutting position by a spring.

In another aspect of the invention, the present invention also includes the method above, wherein the secondary knife is withdrawn to a non-cutting position by the moving mechanism.

In another aspect of the invention, the present invention also includes the method above, wherein a rotation axes of the primary knife and the secondary knife are offset.

In another aspect of the invention, the present invention also includes the method above, wherein the offset is from 1 mm to 12 mm.

In another aspect of the invention, the present invention also includes the method above, wherein the offset is from 5 mm to 9 mm.

In another aspect of the invention, the present invention also includes the method above, wherein the offset is 7 mm.

The present invention also includes a spindle assembly for use in a flange trimming apparatus comprising a spindle, and a container holder mounted on bearings on a first end of the spindle, wherein the container holder is adapted to be freely rotatable.

In another aspect of the invention, the present invention also includes the spindle assembly above, further comprising a cam and a cam follower affixed to a second end of the spindle to advance the spindle.

In another aspect of the invention, the present invention also includes the method above, further comprising springs between the container holder and the spindle.

The present invention also includes a container made by the process above.

In another aspect of the invention, the present invention also includes the container above, wherein the container is plastic.

In another aspect of the invention, the present invention also includes the container above, wherein the container is free of burrs or slivers.

It is to be understood that both the foregoing general description and the following detailed description are exemplary and explanatory only, and are not restrictive of the invention as claimed.

BRIEF DESCRIPTION OF THE DRAWINGS

The foregoing and other features, aspects and advantages of the present invention will become apparent from the following description, appended claims and the exemplary embodiments shown in the drawings, which are briefly described below.

DETAILED DESCRIPTION OF THE PREFERRED EMBODIMENTS

Preferred embodiments of the present invention are now specifically described in more detail with reference to the accompanying drawings. Wherever possible, the same reference numbers are used throughout the drawings to refer to the same or like parts.

The inventors have discovered that the outside flange of a blow molded container can be accurately and efficiently trimmed with a trimming station having primary and secondary knives which are substantially perpendicular to each other. Further, by designing the trimming station so that the secondary knife is moved into a cutting position by being moved in a direction parallel to the axial direction of the container, a high quality cut surface can be achieved. Additionally, the design is simpler than prior art machines and cheaper to build. The inventors have also discovered that added quality can be gained by offsetting the alignment of the primary and secondary knives. A further advantage discovered by the inventors is that quality and reproducibility is significantly improved by operating the trim station by driving only the primary knife and having the secondary knife and the container holder rotate by frictional contact with the primary knife. The frictional operation of the container holder is made possible by a novel spindle assembly.

Figure 3:
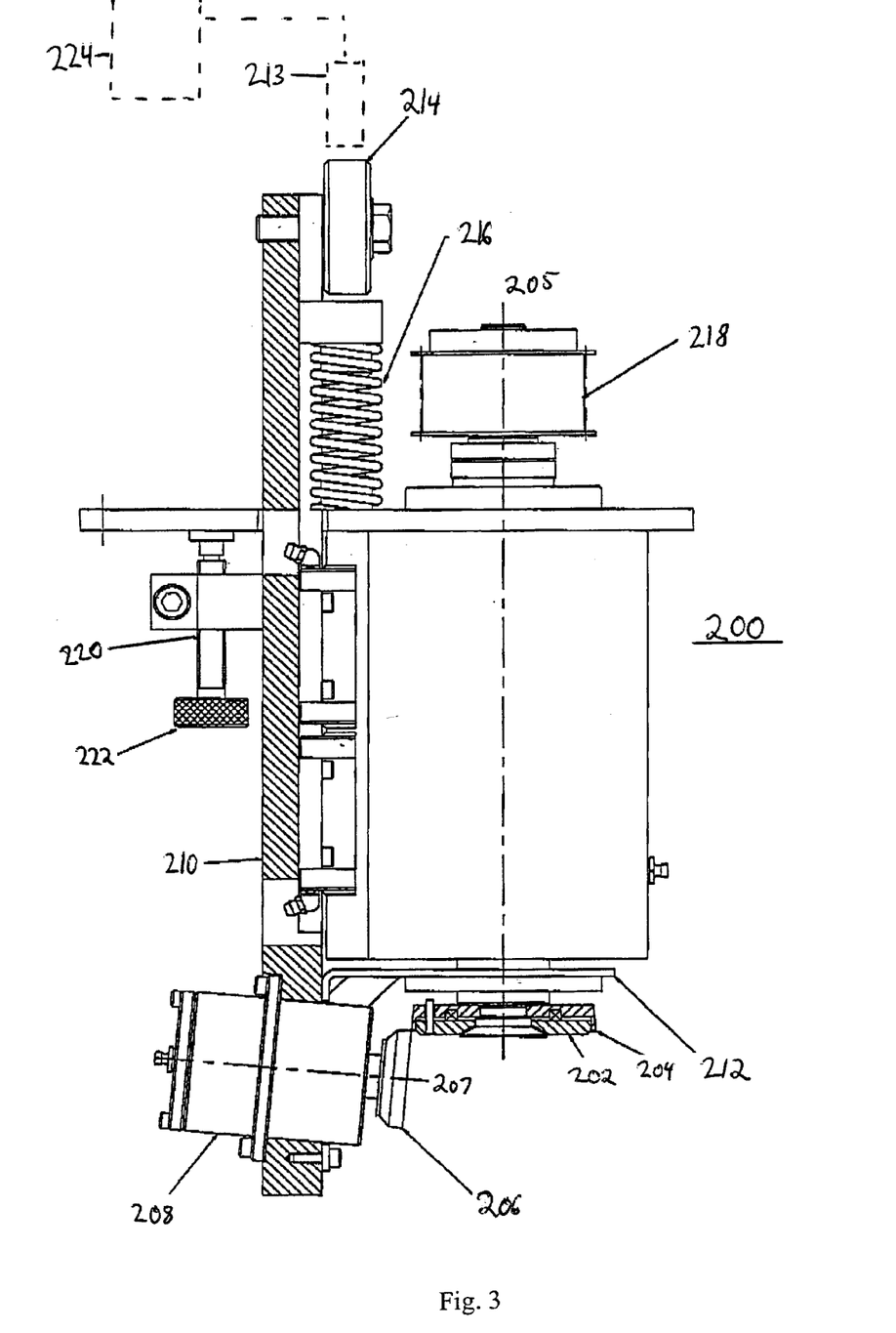
FIG. 3 is a cross-sectional view of a trimming station according to the first embodiment of the invention.

A trim station 200 according to the first embodiment of the invention is illustrated in FIG. 3. The trim station 200 includes a centering cone 202 affixed concentrically to the bottom of a rotating primary knife 204. As depicted in FIG. 3, the primary knife 204 is oriented in a horizontal direction and rotates about an axis of rotation 205. A secondary knife 206 is oriented substantially perpendicular to the primary knife 204 and rotates about a rotation axis 207.

The secondary knife 206 is mounted on a bearing housing 208 and is supported by bearings (not shown) which allow the secondary knife 206 to freely rotate. The bearing housing 208, in turn, is mounted on a reciprocally movable member 210. The movable member 210 is oriented parallel to the axis of rotation 205 of the primary knife 204 and is configured to move in a direction parallel to the axis of rotation 205 (up and down in FIG. 3).

To control the depth of the cut of the secondary knife, a cut adjustment mechanism 220 is attached to the movable member 210. By turning an adjustment knob 222, the limit of the upward movement of the movable member 210 may be set and the depth of the cut of the secondary knife 206 can be decreased or increased. Also attached to the movable member 210 is a trim ring ejector plate 212. When the secondary knife 206 is lowered into a non-cutting position, the trim ring ejector plate 212 also lowers, dislodging any scrap stuck to the primary knife 204.

In normal operation, the secondary knife 206 is held in the cutting position by a spring 216 acting on a flange on the movable member 210. To move the secondary knife 206 to a non-cutting position, a moving mechanism 224 activates a cam 213 which pushes on a cam follower 214 attached to the distal end of the movable member 210. The cam follower 214 pushes the movable member 210, compressing the spring 216 and thereby lowering the secondary knife 206 to a non-cutting position. The moving mechanism 224 may be pneumatic, mechanical, electrical, or any other suitable mechanism known in the art.

The primary knife 204 is mounted on one end of an axle (not shown). Mounted at the opposite end of the axle is a drive wheel 218. In the preferred embodiment of the invention, the drive wheel 218 is connected to a drive mechanism (not shown) via a belt (not shown). In an alternative aspect of the invention, the drive wheel 218 may be connected to the drive mechanism via a chain or gear system (not shown). Whichever mechanism is chosen, in the preferred embodiment of the invention, only the primary knife 204 is connected to the drive mechanism. The secondary knife 206 and a container holder 302, discussed in more detail below, are supported by secondary knife bearings 209 so as to be freely rotatable.

Figure 4:
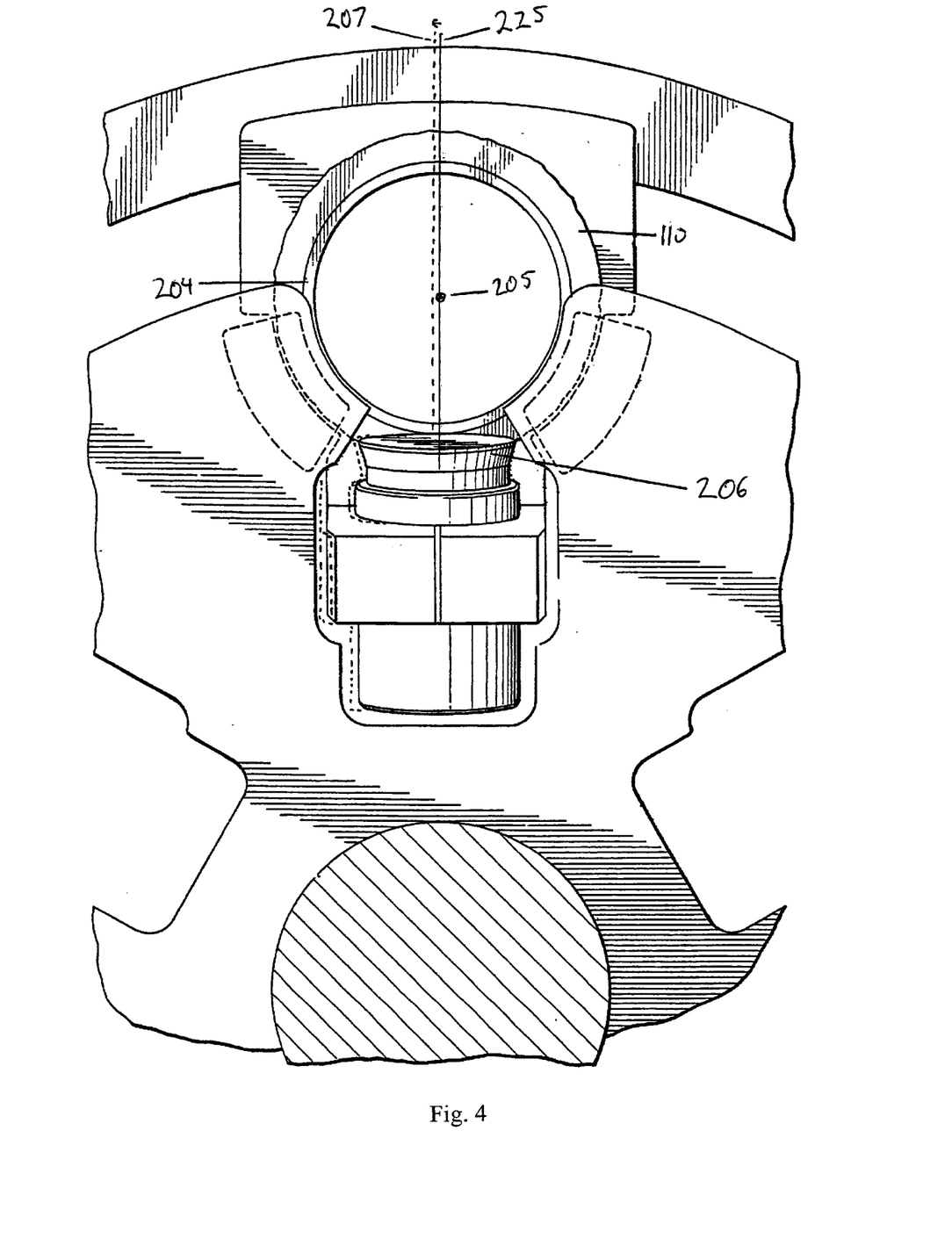
FIG. 4 is a plan view illustrating one aspect of the preferred embodiment of the invention.

FIG. 4 illustrates another aspect of the preferred embodiment of the invention. In this aspect of the invention, the axis of rotation 207 of the secondary knife 206 is offset from the axis of rotation 205 of the primary knife 204. As illustrated in this figure, the axis of rotation 205 of the primary knife 204 is perpendicular to the page and is indicated by a circled point in the middle of the primary knife 204. Also shown on the figure is the prior art axis of rotation 225. The offset is preferably between 1 mm and 12 mm, more preferably between 5 mm and 9 mm, most preferably 7 mm. Further, as illustrated, the offset is to the left, however, the offset may be to the right as well.

Figure 5:
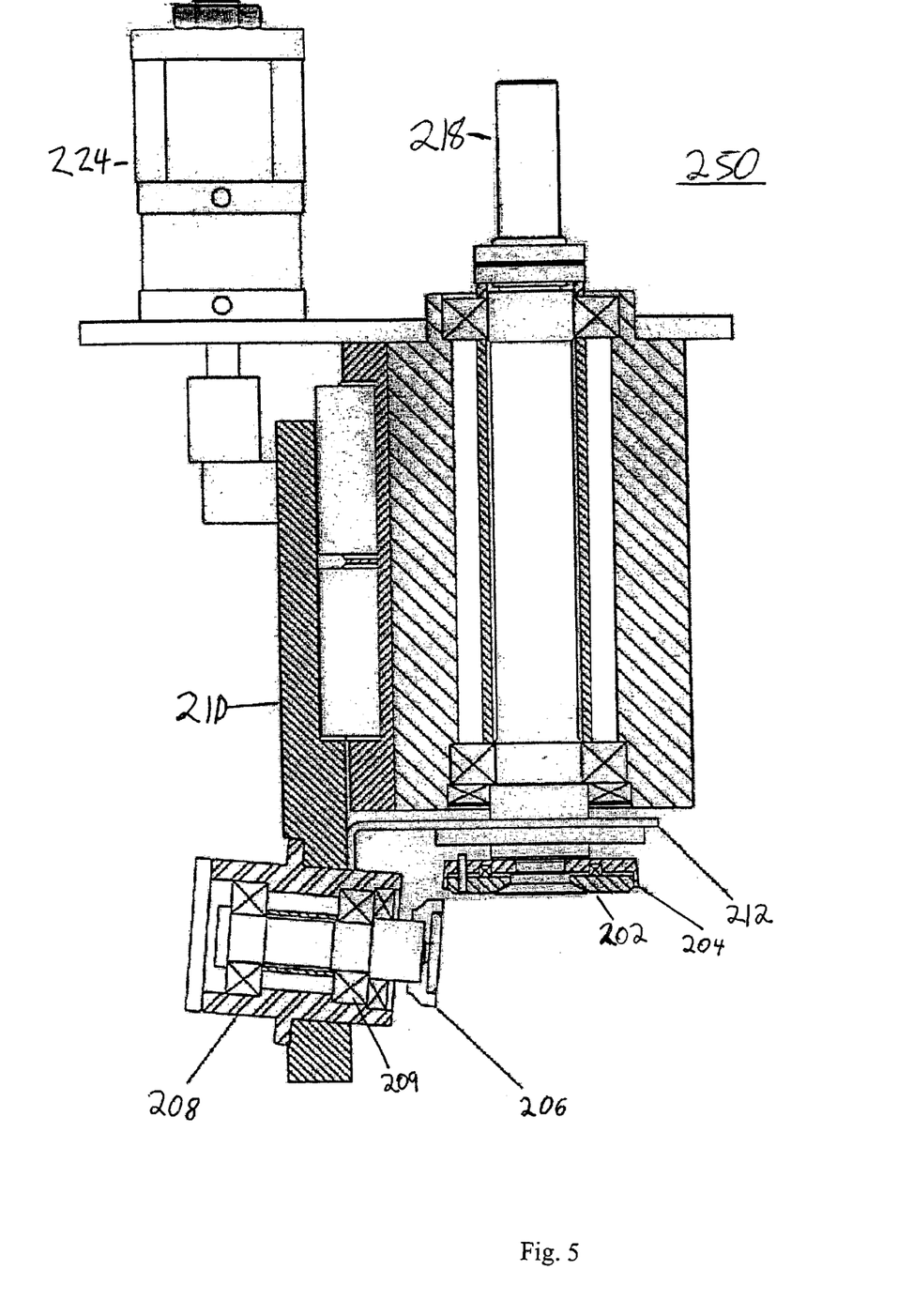
FIG. 5 is a cross-sectional view of a trimming station according to the second embodiment of the invention.

A simpler, but less preferred embodiment of the invention is illustrated in FIG. 5. In a trim station 250, the cut adjustment mechanism 220 has been omitted. Further, there is no spring 216 to bias the secondary knife 206 to the cutting position. Also different in this embodiment is the arrangement of the moving mechanism 224. In this embodiment of the invention, the moving mechanism 224 is adjacent to the drive wheel 218. Thus, it is a more compact arrangement.

Figure 6:
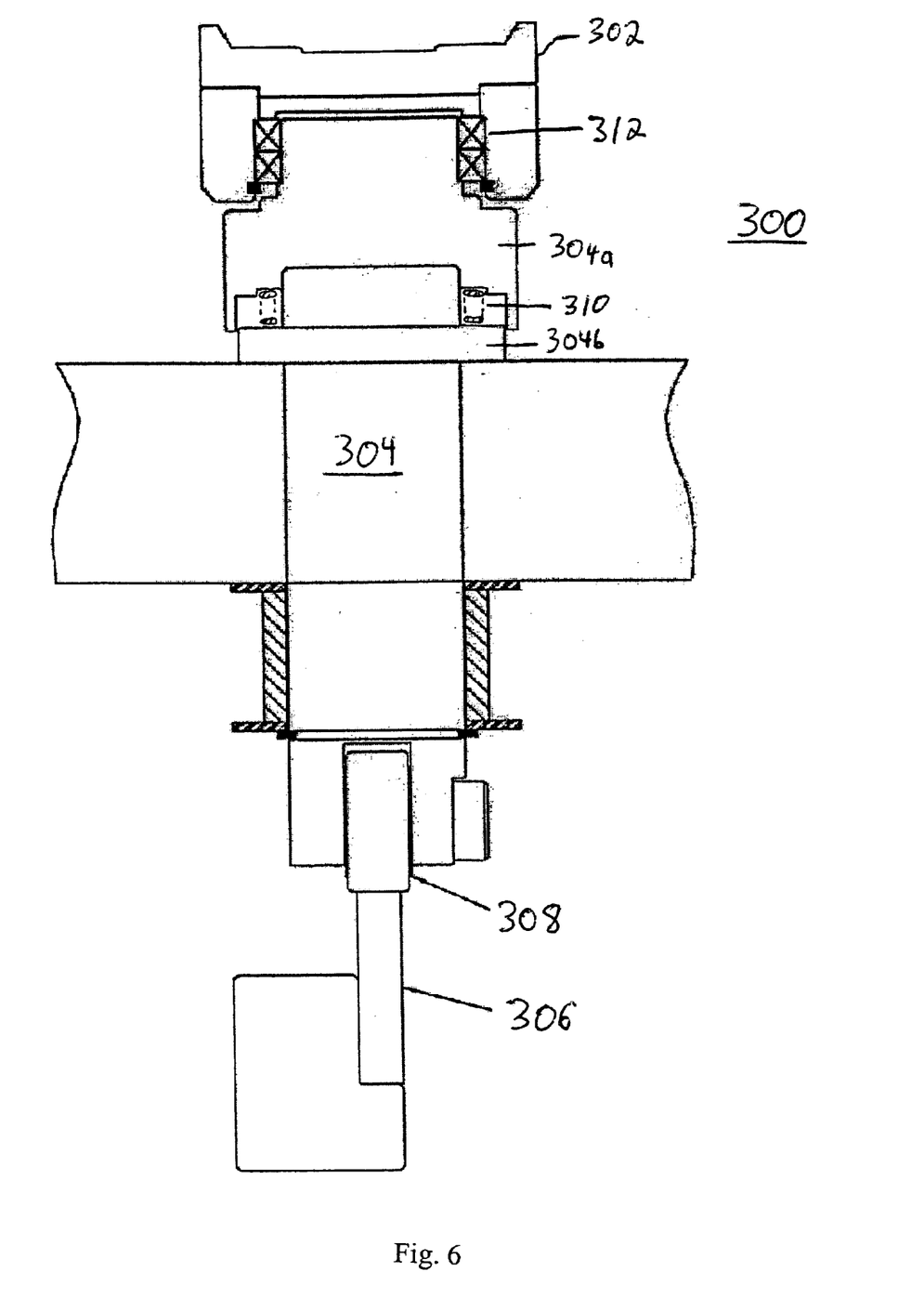
FIG. 6 is a cross-sectional view of a spindle assembly according to another embodiment of the invention.

Included in the various trim stations 200, 250 is a novel spindle assembly 300 illustrated in FIG. 6. The spindle assembly 300 is located below the primary knife 204 and is used to raise a flanged body portion 102 of a container 100 to the primary knife 204. The spindle assembly 300 includes a container holder 302 rotatably mounted on an upper portion 304a of a spindle 304 via spindle bearings 312. The spindle bearings 312 allow the container holder 302 to freely rotate.

Between the upper portion 304a and a lower portion 304b of the spindle 304 are springs 310. The springs 310 help bias the body portion 102 of the container 100 in frictional contact with the primary knife 204. Initially, the springs 310 are relaxed when the flanged body portion 102 of the container 100 is advanced onto the centering cone 202. The body portion 102 is further advanced to the primary knife 204, compressing the springs 310 and ensuring good frictional contact with the primary knife 204.

In the preferred embodiment of the invention, the spindle 304 is advanced while the trim station 200 rotates over a stationary cam 306. As the spindle 304 rotates, a cam follower 308 on the bottom of the spindle 304 rides along a stationary cam 306, causing the spindle 304 to rise and fall. Although a stationary cam/cam follower system is preferred, the invention is not limited to this system. A moving cam could also be employed or any other system known in the art for advancing a spindle 304.

Figure 7:
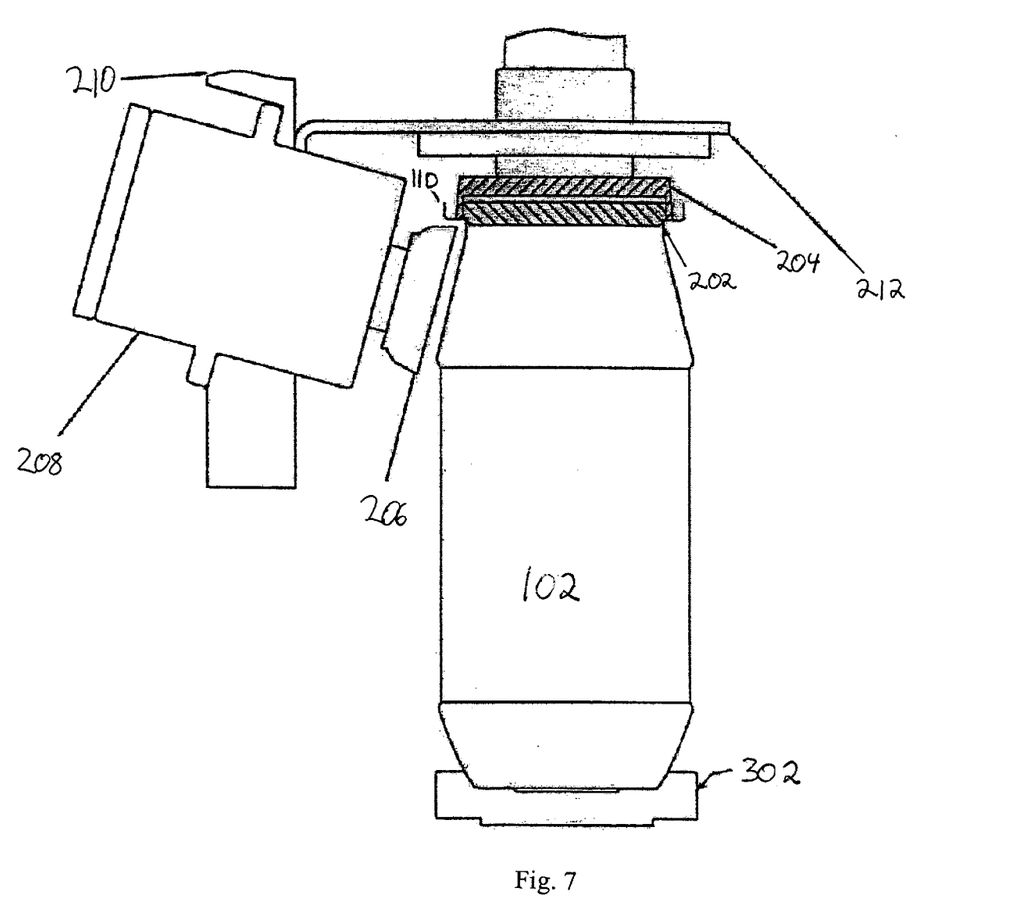
FIG. 7 is a schematic illustration of a bottle being trimmed according to an embodiment of the invention.

The method of trimming an external flange 110 off the body portion 102 of the container 100 can be explained with reference to FIG. 7. The body portion 102 is seated on the container holder 302 and has been raised until centered on the centering cone 202. In this position, the external flange 110 is in frictional contact with the primary knife 204. The movable member 210 is then allowed to rise under the influence of the spring 216 until the secondary knife 206 penetrates the external flange 110. When this occurs, the secondary knife 206 is also in frictional contact due to the pinching force of the flange material.

To completely cut off the external flange 110, the body portion 102 must be rotated. In the preferred embodiment of the invention, this is accomplished by driving the primary knife 204. Because the secondary knife 206 and the container holder 302 are in frictional contact with the primary knife 204 and because they are mounted on bearings 209, 312, they rotate as well. Further, all three (the primary knife 204, the secondary knife 206 and the container holder 302) rotate at the same speed. This results in a quality cut without the need to independently control the speeds of the primary knife 204, the secondary knife 206 and the container holder 302.

Figure 8:
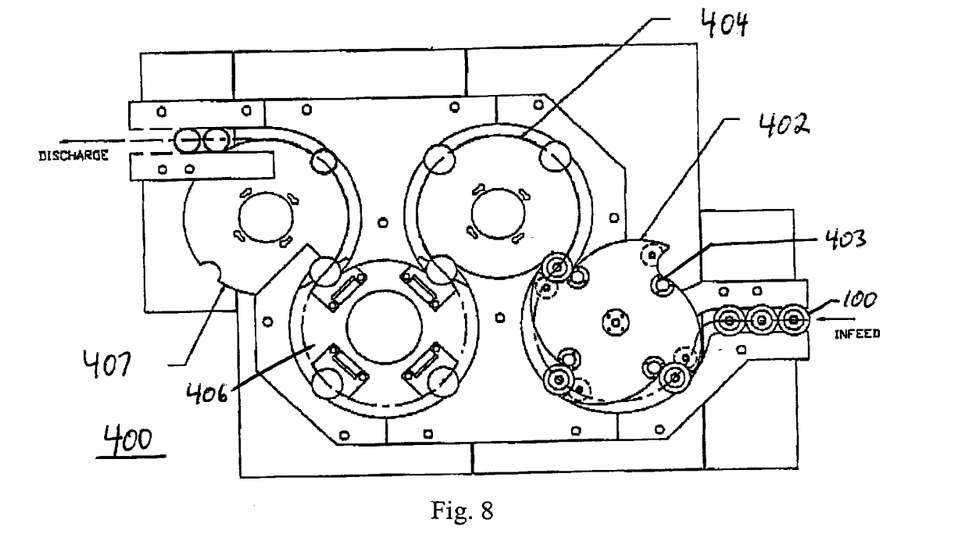
FIG. 8 is a plan view of a trimming apparatus according to an embodiment of the invention.
Figure 9:
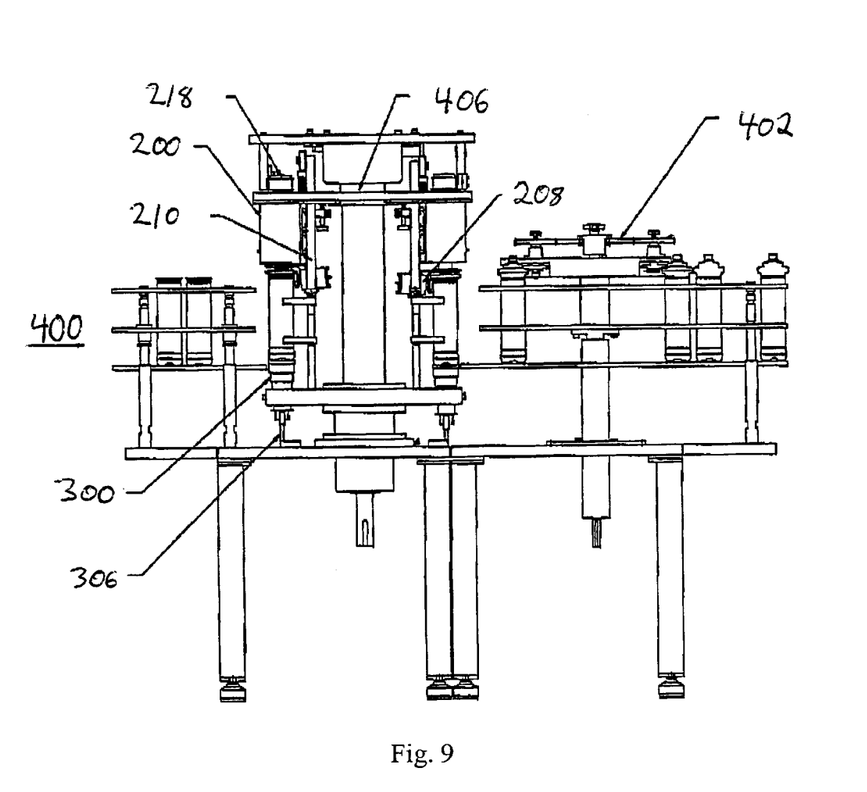
FIG. 9 is a front view of the trimming apparatus of FIG. 8.

FIG. 8 is a plan view of a preferred flange trimming apparatus 400 of the present invention, while FIG. 9 is a front view of the same apparatus. In this embodiment, the flange trimming apparatus 400 includes an infeed starwheel 402 having pretrim stations 403. As-blown containers 100 enter the infeed starwheel 402 and are pre-trimmed in a pretrim station 403. As the infeed starwheel 402 turns, the pretrim station 403 separates the dome portion 104 from the body portion 102. The body portion 102 is passed on to a transfer starwheel 404 while the dome portion 104 is discarded.

From the transfer starwheel 404, the body portion 102 is passed to a trim turret 406. In the preferred embodiment of the invention, the trim turret 406 includes a plurality of trim stations 200. As the trim turret 406 turns, the external flange 110 is trimmed from the body portion 102 of container 100. After the external flange 110 is trimmed and removed, the body portion 102 is passed to a discharge starwheel 407. The discharge starwheel 407 then passes body portion 102 out of the flange trimming apparatus 400 to the next operation in the line.

Figure 10:
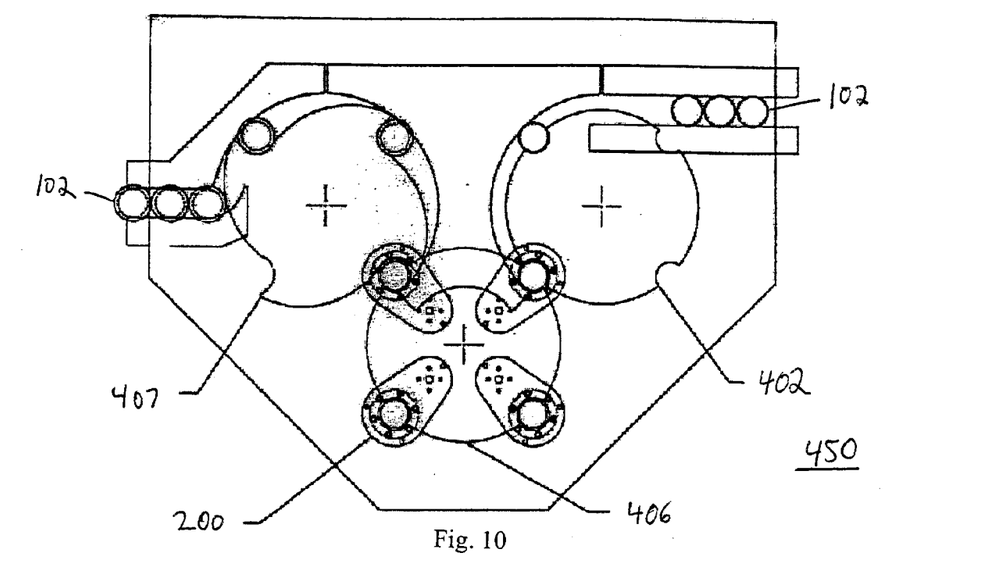
FIG. 10 is a plan view of a trimming apparatus according to another embodiment of the invention.
Figure 11:
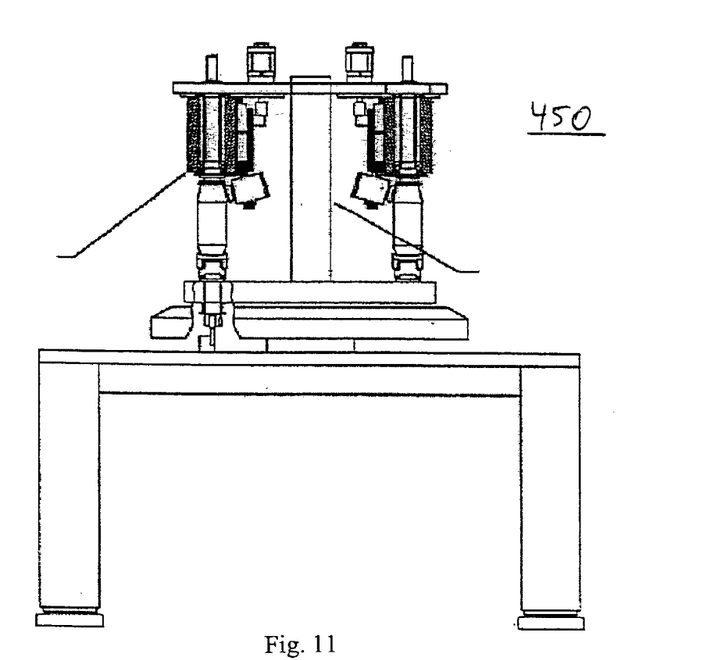
FIG. 11 is a front view of the trimming apparatus of FIG. 10.

FIG. 10 illustrates an alternative flange trimming apparatus 450 of the present invention, while FIG. 11 is a front view of the same apparatus. In this embodiment of the invention, containers 100 are pretrimmed in a separate operation. After pre-trimming, the body portions 102 are fed to an infeed starwheel 402. The infeed starwheel 402 separates the stacked body portions 102 and feeds them to the trim turret 406. In the preferred embodiment of the invention, the trim turret 406 includes a plurality of trim stations 200. As the trim turret 406 rotates, the external flange 110 is trimmed from the body portion 102. The scrap is discharged and the body portion 102 is passed to a discharge starwheel 407. The discharge starwheel 407 then passes the body portion 102 out of the flange trimming apparatus 450 to the next operation in the line.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings and description were chosen in order to explain the principles of the invention and its practical application. It is intended that the scope of the invention be defined by the claims appended hereto, and their equivalents.

What is claimed is:

1. A trim station for trimming a flange of a container comprising:
    a rotating primary knife; and
    a secondary knife mounted on a movable member, wherein the secondary knife is moved into a cutting position by advancing the movable member in a direction parallel to a longitudinal axis of the container, and
    wherein an axis of rotation of the primary knife and an axis of rotation of the secondary knife are offset such that they do not intersect the two axes are non-coplanar and exist in planes that are parallel to each other.

2. A trim station according to claim 1, further comprising a centering cone adapted to center the container on the rotating primary knife.

3. A trim station according to claim 2, further comprising a spindle assembly having a cam and a cam follower, wherein the spindle assembly is adapted to raise the container to the centering cone.

4. A trim station according to claim 1, wherein the secondary knife is frictionally driven by the primary knife.

5. A trim station according to claim 3, further comprising a trim ring ejector plate to remove a trimmed flange from the trim station.

6. A trim station according to claim 3, further comprising a moving mechanism to advance the movable member.

7. A trim station according to claim 6, wherein the moving mechanism is selected from a group consisting of a pneumatic mechanism, a mechanical mechanism and an electrical mechanism.

8. A trim station according to claim 7, wherein the moving mechanism further comprises a spring adapted to hold the secondary knife in a cutting position.

9. A trim station according to claim 8, further comprising a cut adjustment mechanism to adjust the depth of the cut.

10. A trim station according to claim 1, wherein the offset is from 1 mm to 12 mm.

11. A trim station according to claim 10, wherein the offset is from 5 mm to 9 mm.

12. A trim station according to claim 11, wherein the offset is 7 mm.

13. An apparatus for trimming a flange of a container, comprising:
    a plurality of trim stations each comprising:
        a rotating primary knife; and
        a secondary knife mounted on a movable member, wherein the secondary knife is moved into a cutting position by moving the movable member in a direction parallel to a longitudinal axis of the containers
    wherein an axis of rotation of the primary knife and an axis of rotation of the secondary knife are offset, such that they do not intersect and the two are non-coplanar and exist in planes that are parallel to each other.

14. The apparatus of claim 13, wherein the plurality of trim stations are mounted on a rotating trim turret.

15. The apparatus of claim 14, further comprising an infeed starwheel for supplying containers to the trim turret.

16. The apparatus of claim 15, further comprising a discharge starwheel to transfer the container from the trim turret out of the apparatus.

17. The apparatus of claim 16, further comprising a pretrim station.

18. The apparatus of claim 17, wherein the pretrim station is configured to remove a dome portion of a plastic bottle.

\* \* \* \* \*